Figure 1:
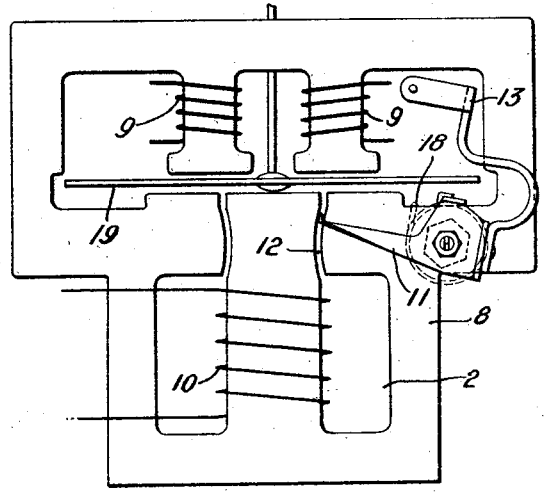

Aug. 25, 1925.

W. M. BRADSHAW ET AL

MAXIMUM DEMAND METER

Filed April 18, 1919

1,551,284

WITNESSES:
H. T. Shelhamer
J. H. Procter

INVENTORS
William M. Bradshaw
Clarence A. Boddie
BY
Wesley G. Carr
ATTORNEY

Patented Aug. 25, 1925.

1,551,284

UNITED STATES PATENT OFFICE.

WILLIAM M. BRADSHAW, OF WILKINSBURG, AND CLARENCE A. BODDIE, OF PITTS-BURGH, PENNSYLVANIA, ASSIGNORS TO WESTINGHOUSE ELECTRIC & MANUFAC-TURING COMPANY, A CORPORATION OF PENNSYLVANIA.

MAXIMUM-DEMAND METER.

Application filed April 18, 1919. Serial No. 291,108.

*To all whom it may concern:*

Be it known that we, WILLIAM M. BRADSHAW, a citizen of the United States, and a resident of Wilkinsburg, in the county of Allegheny and State of Pennsylvania, and CLARENCE A. BODDIE, a citizen of the United States, and a resident of Pittsburgh, in the county of Allegheny and State of Pennsylvania, have invented a new and useful Improvement in Maximum-Demand Meters, of which the following is a specification.

Our invention relates to electrical measuring instruments and particularly to means for varying the torque of motor meters in accordance with the mechanical load on the movable members thereof.

One object of our invention is to provide means for so automatically varying the torque of a motor meter in accordance with the resistance offered to the movement of the movable member thereof that its registration is correct under all conditions of operation.

Another object of our invention is to provide a device of the above indicated character that shall permit a slowly-responsive motor meter to be variously loaded and still correctly indicate the maximum demand.

A further object of our invention is to provide a device of the above indicated character that shall be simple and inexpensive to construct and effective in its operation.

Copending application, Serial No. 257,326, filed Oct. 8, 1918, by Walter G. Mylius and assigned to the Westinghouse Electric & Mfg. Co. discloses an attachment for a motor meter that comprises a spring, one end of which is wound by the motor meter and the other end of which is retarded by a damping magnet. A pointer is actuated in accordance with the differential movement of the two ends of the spring and thus constitutes a maximum-demand indicator. Since the motor meter winds one end of the spring, the load thereon must necessarily vary and thus, unless some means is provided for varying the torque of the motor meter in accordance with the change in load on the movable member thereof, inaccurate indications may be obtained.

In view of the above, we provide a closed-circuit winding for the pole pieces of the motor meter electromagnet and cause the same to be automatically varied in accordance with the movement of the pointer to thereby shunt magnetic flux from the armature in inverse proportion to the mechanical load thereon. With this arrangement, the speed of the armature will not be affected by reason of the tensioning of the spring and, consequently, will vary only in accordance with the load traversing the windings thereof.

Figure 2:
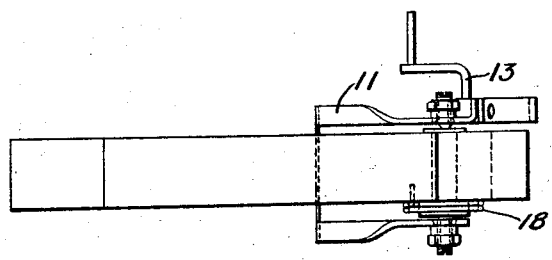
Figure 3:
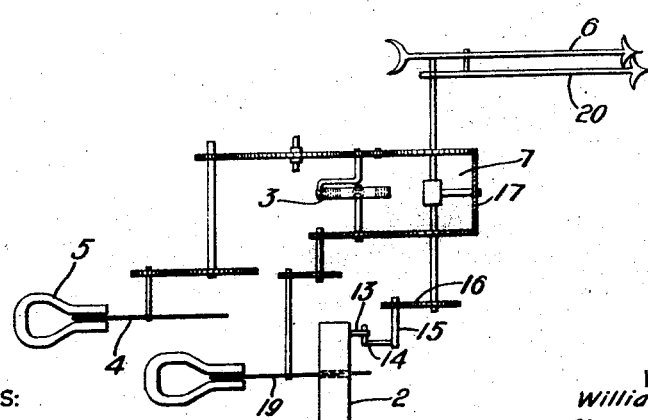

Fig. 1 of the accompanying drawings is a front view of a motor meter embodying our invention; Fig. 2 is a top plan view of the motor meter shown in Fig. 1, and Fig. 3 is a diagrammatic view of a maximum-demand meter embodying our invention.

A maximum-demand meter 1, embodying our invention, comprises, in general, a motor meter 2, a spring 3 that is wound from one end by the motor meter 2 and the unwinding of the other end of which is controlled by a disk 4 and a damping magnet 5. A pointer 6 is actuated through a differential gearing 7, in accordance with the differential movement of the two ends of the spring 3, and thus indicates, at all times, a value that may be assumed to be the demand equivalent of the load traversing the motor meter 2. A maximum-demand pointer 20 is actuated by the pointer 6.

The motor meter 2 comprises a stationary magnetizable member 8, current and potential windings 9 and 10, respectively, and a closed-circuit winding or member 11 that is pivotally mounted for movement in the air gap 12 of the member 8. The winding 11, which consists of a single turn, is provided with a lever arm 13 that is connected, through a crank arm 14, to a shaft 15 that is connected, through gear members 16, to the planetary member 17 of the differential-gear device 7. A spring 18 is provided for yieldingly biasing the member 11 towards its uppermost position. The member 11 is adapted to be actuated, through the crank arm 14, by the planetary member 17 to permit more flux from the electromagnet 8 to cut the armature 19 and thus increase the torque of the same in accordance with the increase in mechanical load imposed thereon by reason of the tensioning of the spring 3.

With this device, the accuracy of the motor meter 2 is maintained because its speed does not decrease when the armature becomes mechanically loaded and, consequently, a meter having a high degree of accuracy is obtained.

Our invention is not limited to the specific structure illustrated, as it may be variously modified without departing from the spirit and scope thereof, as set forth in the appended claims.

We claim as our invention:

1. In a watthour meter, the combination with a spring one end of which is connected to the movable member of the meter, means for retarding the movement of the other end of the spring and a pointer actuated in accordance with the differential movement of the ends of the spring, of means actuated in accordance with the indication of the pointer for varying the torque of the meter to compensate for the torque required to wind the spring.

2. In a watthour meter, the combination with a movable member, a pointer and a spring disposed between the pointer and the movable member, of a torque varying device for the meter, and means for adjusting the said device in accordance with the tension of the spring.

3. In a meter, the combination with a movable member and a spring wound thereby, of means for varying the torque of the movable member in accordance with the load imposed thereon by reason of the tensioning of the spring.

4. A motor meter comprising a movable member, a pointer, a spring disposed between the pointer and the movable member and means for varying the torque of the movable member in accordance with the change in the load thereon incident to tensioning the spring.

5. A motor meter comprising the combination with a movable member and means for imposing a variable mechanical load thereon, of a regulating member and means automatically responsive to variations in the mechanical load on the movable member for adjusting the regulating member to cause the speed of the motor meter to correspond to a quantity to be measured.

6. A motor meter comprising the combination with a magnetizable core member, an armature and means for imposing a variable mechanical load thereon, of means for shifting the magnetic flux of the core member with reference to the armature and means for adjusting said shifting means in accordance with changes in the mechanical load on the armature to ensure a speed of the armature corresponding to the electrical load.

7. A motor meter comprising the combination with a magnetizable core member, an armature and means for imposing a variable mechanical load thereon, of means for diverting the magnetic flux passing through the armature and automatic means for adjusting said diverting means to cause the torque of the meter armature to vary in accordance with variations in the mechanical load on the armature.

8. A motor meter comprising the combination with a magnetizable core member, an armature and means for imposing a variable mechanical load thereon, of a closed-circuit winding for diverting the flux from the core member through the armature and means responsive to the load on the armature for adjusting said winding to vary the torque developed by the armature in accordance with variations in the mechanical load thereon.

9. A meter comprising a movable operating member, means for actuating the same by forces in accordance with a quantity being measured, an indicating member actuated by said member, means for causing the movable member to operate at all times under predetermined varying load, and means for causing the indicating member to accurately indicate the quantity being measured irrespective of said load variations.

10. A meter comprising a movable operating member, means for actuating the same by forces in accordance with a quantity being measured, an indicating member actuated thereby, variable retarding means between the movable member and the indicating member, and means for controlling the torque of the movable member in accordance with variations in retardation of the retarding means to cause the indicating member to accurately indicate the quantity being measured irrespective of said variations.

11. A meter comprising an operating member, means for actuating the same by forces proportional to a quantity to be measured, an indicating member, yieldable means connected between the operating member and the indicating member for transmitting movement to the indicating member, means for controlling the operation of said yieldable means and means connected to the yieldable means and responsive to variations therein for causing the actuating means to so actuate the operating member as to compensate for variations in the resistance exerted by the yieldable means.

In testimony whereof, we have hereunto subscribed our names this 31st day of March, 1919.

WILLIAM M. BRADSHAW.
CLARENCE A. BODDIE.